United States Patent [19]

Ohtsuka

[11] Patent Number: 5,007,049
[45] Date of Patent: Apr. 9, 1991

[54] ELECTRONIC EXCHANGE HAVING A CONFERENCE TELEPHONE COMMUNICATION FUNCTION AND CONFERENCE TELEPHONE COMMUNICATION METHOD

[75] Inventor: Eiji Ohtsuka, Hino, Japan

[73] Assignee: Kabushiki Kaisha Toshiba, Kawasaki, Japan

[21] Appl. No.: 327,276

[22] Filed: Mar. 22, 1989

[30] Foreign Application Priority Data

Mar. 25, 1988 [JP] Japan ................... 63-69612

[51] Int. Cl.$^5$ .............................. H04M 3/56
[52] U.S. Cl. ...................................... 370/62
[58] Field of Search .............. 370/62; 379/202

[56] References Cited

U.S. PATENT DOCUMENTS

| | | | |
|---|---|---|---|
| Re. 31,814 | 1/1985 | Lubin | 370/62 |
| 3,984,643 | 10/1976 | Inrig et al. | 370/62 |
| 4,054,757 | 10/1977 | LeJay | 370/62 |
| 4,276,639 | 6/1981 | Fukuda et al. | 370/62 |
| 4,387,457 | 6/1983 | Munter | 370/62 |
| 4,499,578 | 2/1985 | Marouf et al. | 370/62 |
| 4,606,021 | 8/1986 | Wurst | 370/62 |
| 4,635,252 | 1/1987 | Kuchler | 370/62 |

Primary Examiner—Douglas W. Olms
Assistant Examiner—Melvin Marcelo
Attorney, Agent, or Firm—Finnegan, Henderson, Farabow, Garrett, and Dunner

[57] ABSTRACT

An improved (N - 1) adding operation conference telephone communication method through an electronic exchange in which the telephone communication signals on speakers in a time sharing multiplexed telephone communication path are added, the telephone communication signal on any particular speaker is subtracted and the resulting telephone communication signals are transferred to the remaining respective speakers. The levels of the telephone communication signals are monitored which are obtained as the result of the (N - 1) adding operation. When the telephone communication signals exceed a preset threshold level, they are selectively attenuated and transferred to the remaining respective speakers. The selective attenuation of the telephone communication signals which have exceeded the threshold level is released a predetermined time after conditions under which the threshold level is exceeded have disappeared to thereby prevent satisfactorily the deterioration of the voice quality which would otherwise be feared.

5 Claims, 10 Drawing Sheets

PHASE1: WRITE IN SPM
PHASE2: CONFERENCE OPERATION (WRITE INTO & READ FROM SPM)
PHASE3: READ FROM SPM

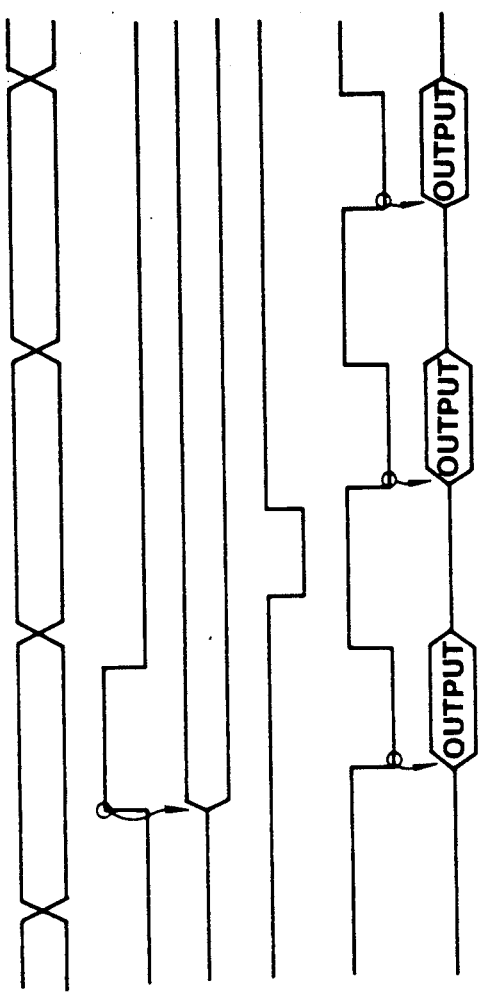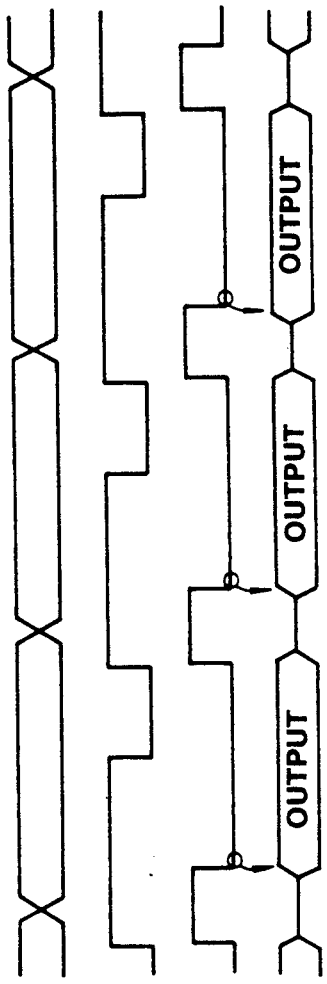

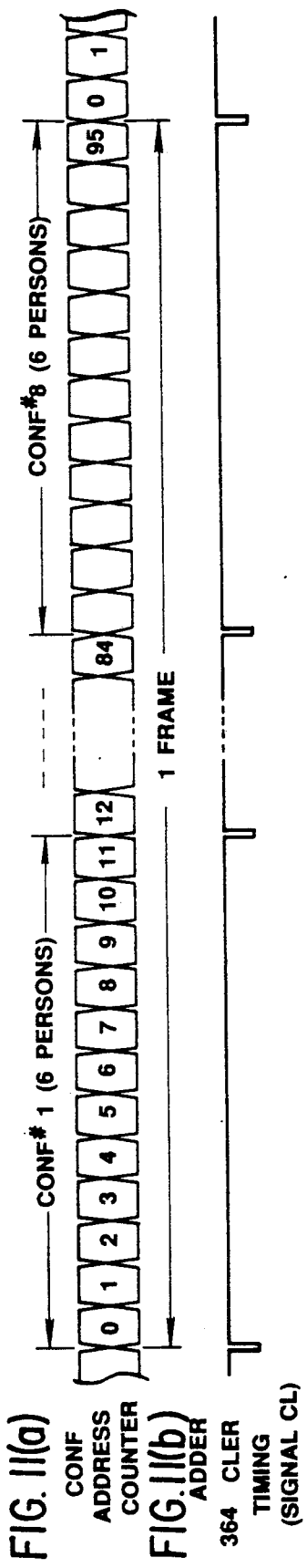
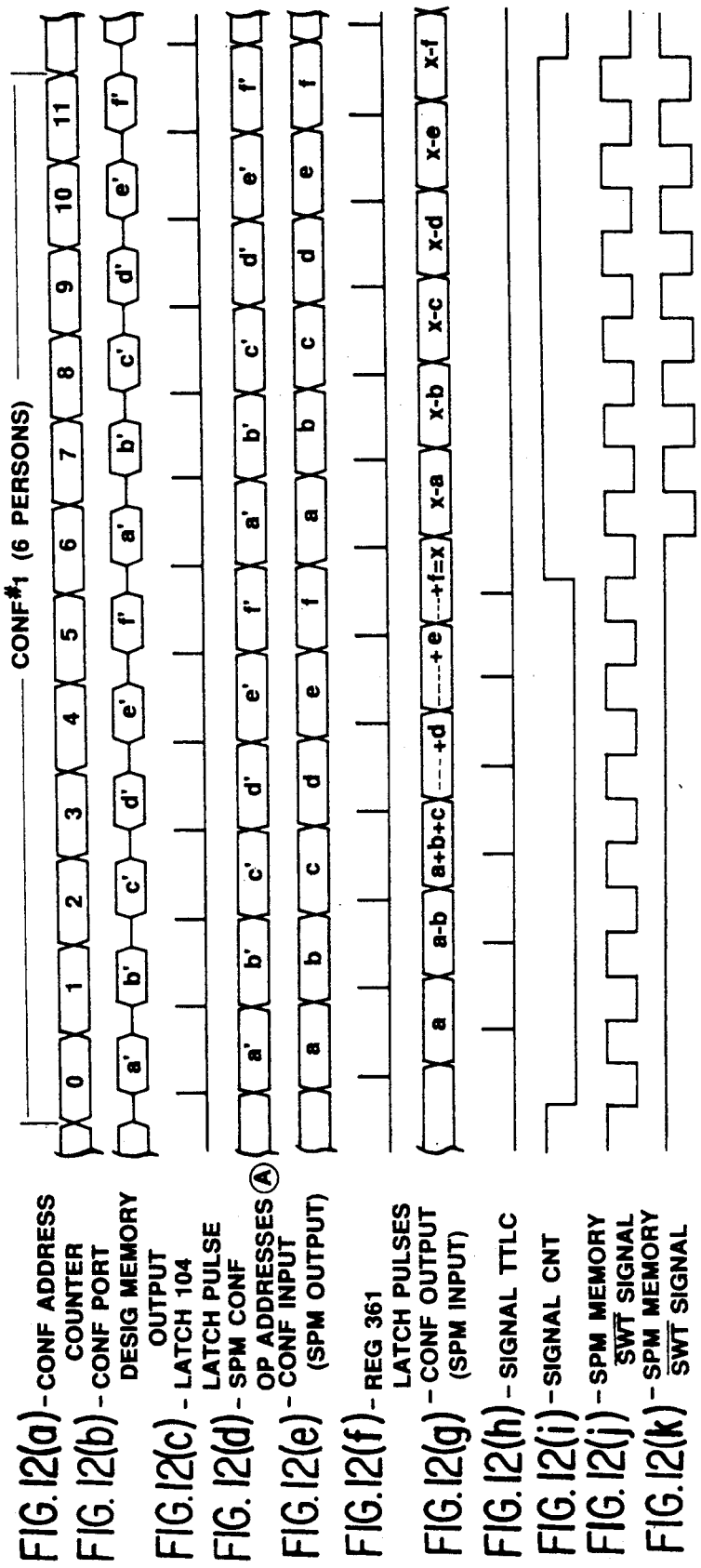

ELECTRONIC EXCHANGE HAVING A CONFERENCE TELEPHONE COMMUNICATION FUNCTION AND CONFERENCE TELEPHONE COMMUNICATION METHOD

BACKGROUND OF THE INVENTION

1. Field of the Invention

The present invention relates to electronic exchanges with a conference telephone communication function and conference communication methods which add telephone communication signals on speakers in time sharing multiplexed channels, subtract the telephone communication signal on any particular speaker and transfer them to the remaining speakers, and more particularly to apparatus and methods which prevent the deterioration of the voice quality occurring, for example, when a plurality of speakers start to talk simultaneously.

2. Description of the Related Art

Generally, methods of exchanging a conference telephone communication (simultaneous telephone communications by three or more speakers) through an electronic exchange are mainly divided into two: an "adding method" which adds all the speaker' voice signals and transfers the result to the respective speakers and an "exchange method" which selects a particular speaker's voice signal and transfers it to the respective speakers.

The "adding method" will be now described. The "adding method" is a so-called (N-1) adding method which is a system in which the telephone communication signals (PCM data) on the voices of all the speakers participating in a conference are temporarily added, the telephone communication signal (PCM data) of a particular speaker is subtracted from the result of the addition and the result of the subtraction is transferred to the respective speakers. The data (PCM data) thus formed is transferred as telephone communication signals to the respective speakers (participating in the conference).

When telephone communication signals including the PCM data are transmitted to the respective participators, they are converted via a digital-to-analog (D/A) converter to analog signals, which are then demodulated as voices.

In such a conference telephone communication through an electronic exchange, two or more speakers may often talk simultaneously because the conference is a simultaneous telephone communication by three or more speakers.

Therefore, the signal levels of the acoustically demodulated analog signals are unstable. Even if a voice signal at a preferred level is obtained when one speakers talks, the signal level obtained if two or more speakers start to talk simultaneously would automatically become high enough to be offensive to the ear. In an extreme case, the signal becomes distorted to thereby greatly deteriorate the voice quality.

SUMMARY OF THE INVENTION

It is therefore an object of the present invention to provide an electronic exchange with a conference telephone communication function and a conference telephone communication method which are capable of acoustically demodulating a telephone communication signal invariably at an optimal signal level (volume).

In order to achieve such object, in the invention, the levels of the telephone communication signals transferred to the remaining respective speakers are monitored, the telephone communication signals which have exceeded a preset threshold level are selectively attenuated, and the attenuated signals are transferred to the remaining respective speakers.

Thus, even if a single speaker talks as well as two or more speakers talk simultaneously, the voice signal level is maintained invariable at a proper level to thereby avoid deterioration of the voice quality.

In the present invention, the level of the telephone communication signal is attenuated under the above conditions, and this attenuation is released a given time after the conditions on the telephone communication signal level have disappeared.

Thus fluctuations in the amplitude of the communication signal (and hence the voice signal) are prevented from being uselessly repeated at short periods to thereby prevent an uncomfortable feeling from being given to the respective speakers.

BRIEF DESCRIPTION OF THE DRAWINGS

FIGS. 9a to 9f are timing chart showing an illustrative operation of a conference port designating memory of FIG. 8.

FIGS. 10a to 10d are timing chart showing the illustrative operation of a timer memory of FIG. 8.

FIGS. 11a and 11b are timing chart showing the operation of a conference address counter of FIG. 8 and an adder of FIG. 7.

FIGS. 12a to 12k are timing chart showing the operational state of the CONF in the time zone of a conference 1 shown in FIG. 11.

DESCRIPTION OF THE PREFERRED EMBODIMENT

Figure 1:
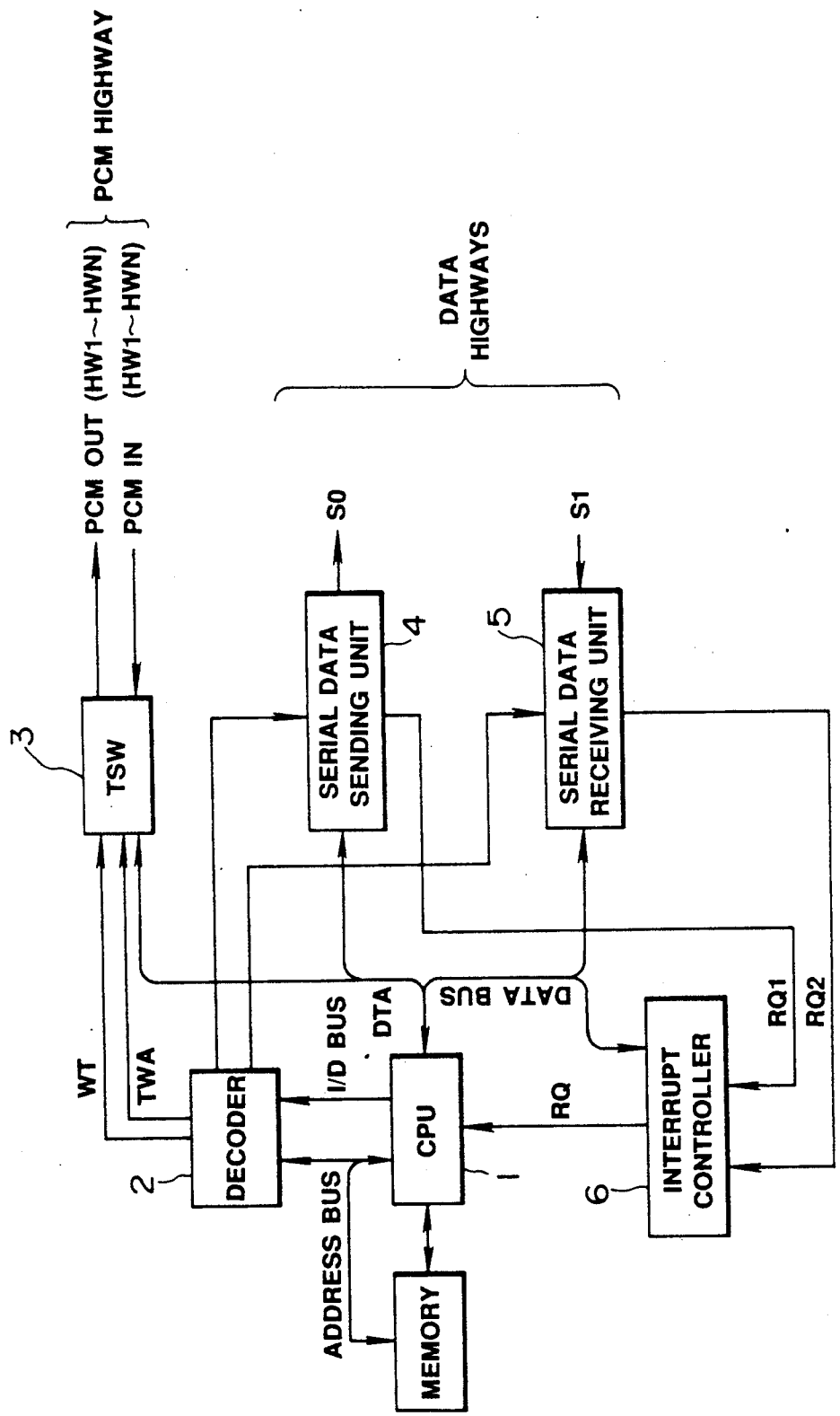
FIG. 1 is a block diagram of a central control system in one embodiment of an electronic exchange with a conference telephone communication function according to the present invention.
Figure 2:
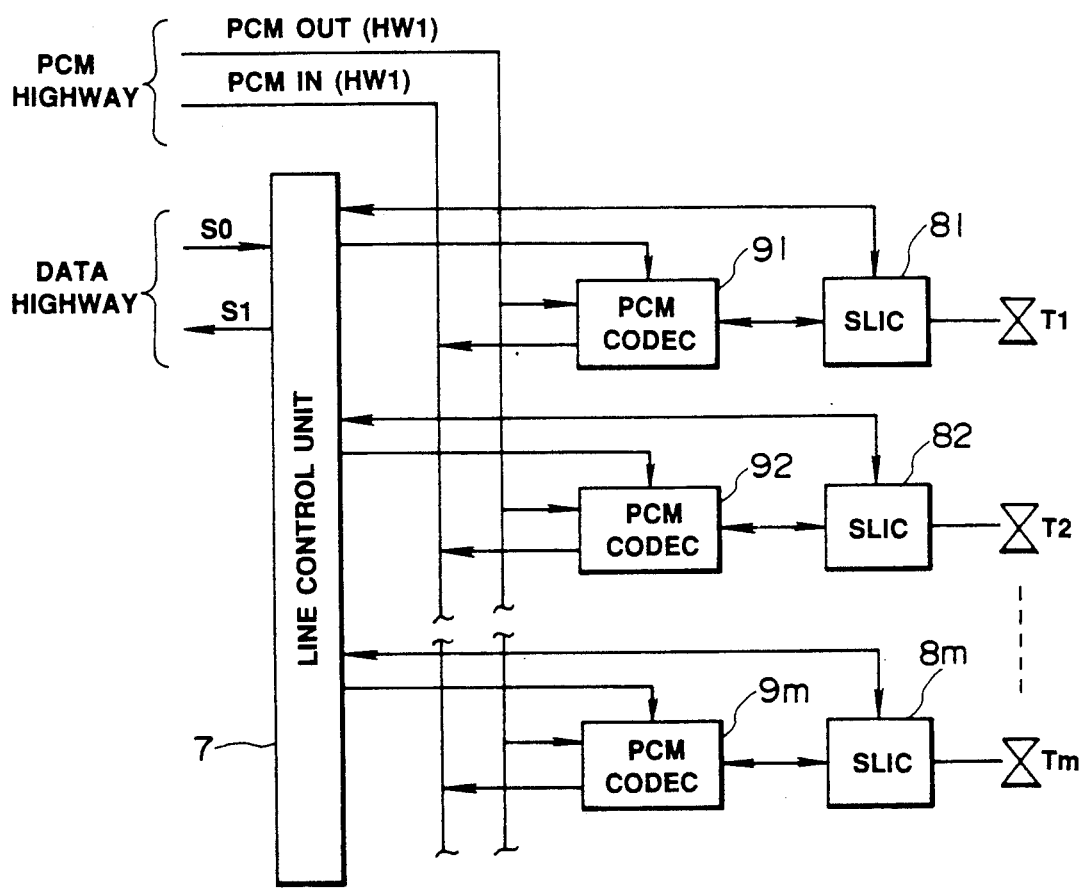
FIG. 2 is a schematic block diagram of a line circuit system of telephone communication terminals connected to a data highway and a PCM highway of the central control system shown in FIG. 1.

FIGS. 1-12 show one embodiment of an electronic exchange with a conference telephone communication function according to the present invention. FIGS. 1 and 2 schematically show the structure of a central control system of the electronic exchange and the structure of a line circuit system of telephone communication terminals connected to a data highway and a PCM highway of the central control system, respectively.

First, the electronic exchange will be outlined with reference to FIGS. 1 and 2. The electronic exchange includes a central control system, as shown in FIG. 1, which, in turn, includes a CPU 1 systematically controlling the operation of the whole exchange in accordance with each of interrupt requests RQ, etc.; a decoder 2 which decodes various instructions issued by the CPU 1; a time sharing switch (TSW) 3 which performs a time sharing exchange operation for a telephone communication signal on the PCM highway in accordance with the signals (a write signal WT and a write address WA) decoded by the decoder 2 and data DTA applied to CPU 1 via a data bus; a serial data sending circuit 4 which serially converts data DTA, transmitted from the CPU 1 to the data bus, in accordance with a transmission command applied by the CPU 1 via the decoder 2 and outputs it to a data highway (output data highway SO); a serial data receiving circuit 5 which receives serial data picked up from the data highway (input data highway SI), converts the serial data to parallel data in accordance with a transmission command issued by the CPU 1 via the decoder 2, and outputs the resulting data on the data bus to CPU 1; and an interrupt controller 6 which provides interrupt control to the CPU 1 in accordance with respective interrupt request signals RQ1 and RQ2 issued from the serial data sending and receiving circuts 4 and 5 for the purposes of transmission and reception.

As shown in FIG. 2, the line circuit system for the telephone communication terminals includes subscriber line circuits (SLIC) 81-8m provided in correspondence to telephone sets T1-Tm, PCM codecs (PCM CODEC) 91-9m which perform an A/D conversion and a D/A conversion of voice signals between these subscriber line circuits 81-8m and the PCM highway, and a line control unit 7 which controls data transmission/reception in the data highways among the serial data sending and receiving circuits 4 and 5, the subscriber line circuits 81-8m, and the PCM codec 91-9m. The electronic exchange performs data transmission/reception for a so-called logical line connection via one data highway among the plurality of subscriber lines, and exchanges voice signals (telephone communication signals) via the other PCM highway among the logically connected subscriber lines.

The operation of the exchange for making a telephone communication between two subscribers will be described. Call signals from the telephone sets T1-Tm connected as the telephone communication terminals of the line circuit system of FIG. 2 are monitored by the loop monitoring operation of the subscriber line circuits 81-8m corresponding to the respective telephone sets.

Assume now that, for example, the telephone T1 is off-hooked and that a dial signal is sent, for example, to the telephone set T2. The call signal due to the off-hook operation of the telephone set T1 is detected by the subscriber line circuit 81, and the call signal and the dial signal are sent as serial data via the line control unit 7 to the input data highway S1 of the central control system. The data is input to the FIG. 1 serial data receiving circuit 5. The receiving circuit 5 issues an interrupt request signal RQ2 when it receives from the input data highway S1 data on the call signal and dial signal from the telephone set T1. The interrupt request signal RQ 2 is input as an interrupt request RQ to the CPU 1 via the interrupt controller 6.

When the CPU 1 receives the interrupt request RQ, it fetches via the data bus the data transmitted from the telephone set T1 and stored temporarily in the serial data receiving circuit 5, and analyzes the contents of the dial signal.

If it is known that the communication terminal shown by the dial signal is the telephone set T2 as the result of the analysis, the CPU 1 sends a call signal to the telephone set T2 via the data bus and the serial data sending circuit 4 to the output data highway SO. The call signal sent to the output data highway SO is transferred via the line control unit 7 to the subscriber line circuit (SLIC) 82 corresponding to the telephone set T2.

The subscriber line circuit 82 to which the call signal has been transferred starts calling the telephone sets T2. If the user of the telephone set 2 responds to the call signal by its off-hook operation, the response signal is sent to the serial data receiving circuit 5 via the line control unit 7 and input data highway SI.

Thus the serial data receiving circuit 5 again generates an interrupt request signal RQ2, interrupts the CPU 1 via the interrupt controller 6 to thereby cause the CPU 1 to read the response signal from the telephone set T2.

When the CPU 1 reads the response signal from the telephone set T2, it sends via the serial data sending circuit 4 to the output data highway SO commands to render active the PCM codecs 91 and 92 corresponding to the telephone sets T1 and T2 to bring these telephone sets into a communication state.

The sent commands are decoded by the line control unit 7. As the result of the decoding, the line control unit 7 sends an enable signal to the PCM codecs 91 and 92 to thereby enable same and hence to perform the A/D conversion of the voice signal (telephone communication) to a PCM signal and the D/A conversion of the voice signal to an analog signal.

When the CPU 1 has sent the command to enable the PCM codecs 91 and 92, it starts to control the time sharing switch (TSW) TWS 3 in order to perform a time sharing exchange of the voice signal sent/received between the telephone sets T1 and T2 subsequent to the transmission of the command.

Figure 3:
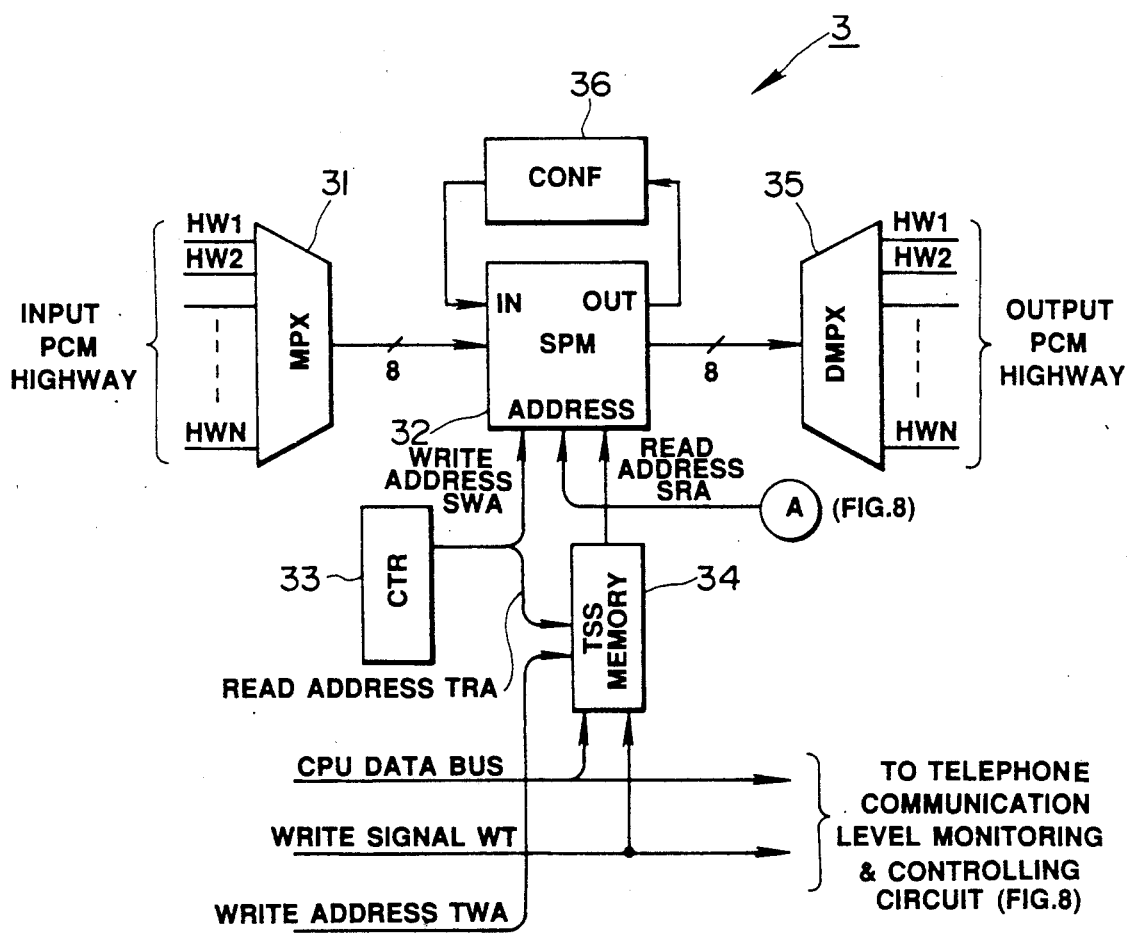
FIG. 3 is a block diagram of a specific time sharing switch (TSW) of FIG. 1.

As shown in detail in FIG. 3, the time sharing switch 3 includes a multiplexer (MPX) 31 which multiplexes PCM data received from N-channel input PCM highways HW1-HWN onto PCM data of a 8-bit word, a speech memory (SPM) 32 which stores the multiplexed PCM data, an address counter (CTR) 33 which counts and determines the write address SWA such that the multiplexed PCM data is sequentially written into the speech memory 32, an exchange control (TSS) memory 34 which uses the counts of the address counter 33 as an address TRA to read the TSS memory 34 itself, controls what is read from the PCM data written in the speech memory 32 and the reading timing therefor in accordance with the read address TRA and commands (data DTA, write signal WT and write address TWA) from the CPU 1 to thereby perform an exchange operation, a demultiplexer (DMPX) 35 which distributes the multiplexed PCM data read from the speech memory 32 to the output PCM highways HW1-HWN, and a conference operation circuit (CONF) 36 which controls the exchange in the conference telephone communication. Each of the input PCM highways HW1-HWN includes, for example, 32 channel time sharing time slots TSO-TS31, each of which receives 8-bit PCM data at a rate of 2048 Mb/s. In the line circuit system of FIG. 2, a maximum of 32 (m=32) telephone sets are allocated to one input/output PCM highway. While, for convenience, in FIG. 2 only the PCM codecs 91-9m are shown which are connected to the input PCM highway HW1 and output PCM highway HW1, respectively, the PCM codecs are similarly connected to other input-/output PCM highways HW2-HWN.

Since the PCM codecs 91 and 92 are rendered active, as mentioned above, voice signals sent from the telephone sets T1 and T2 are converted to PCM data by the corresponding codecs 91 and 92, and input to the time sharing switch (TSW) 3 via the input PCM highway HW1 in respective time slots. These PCM data on the telephone sets T1 and T2 input to the time sharing switch 3 are multiplexed by the multiplexer (MPX) 31 and written into the speech memory (SPM) 32. The addresses at which those data are written in the speech memory 32 are sequentially designated by the speech memory write addresses SWA corresponding to the counts of the address counter (CTR) 33. The write signals in this case are not shown.

Figure 4:
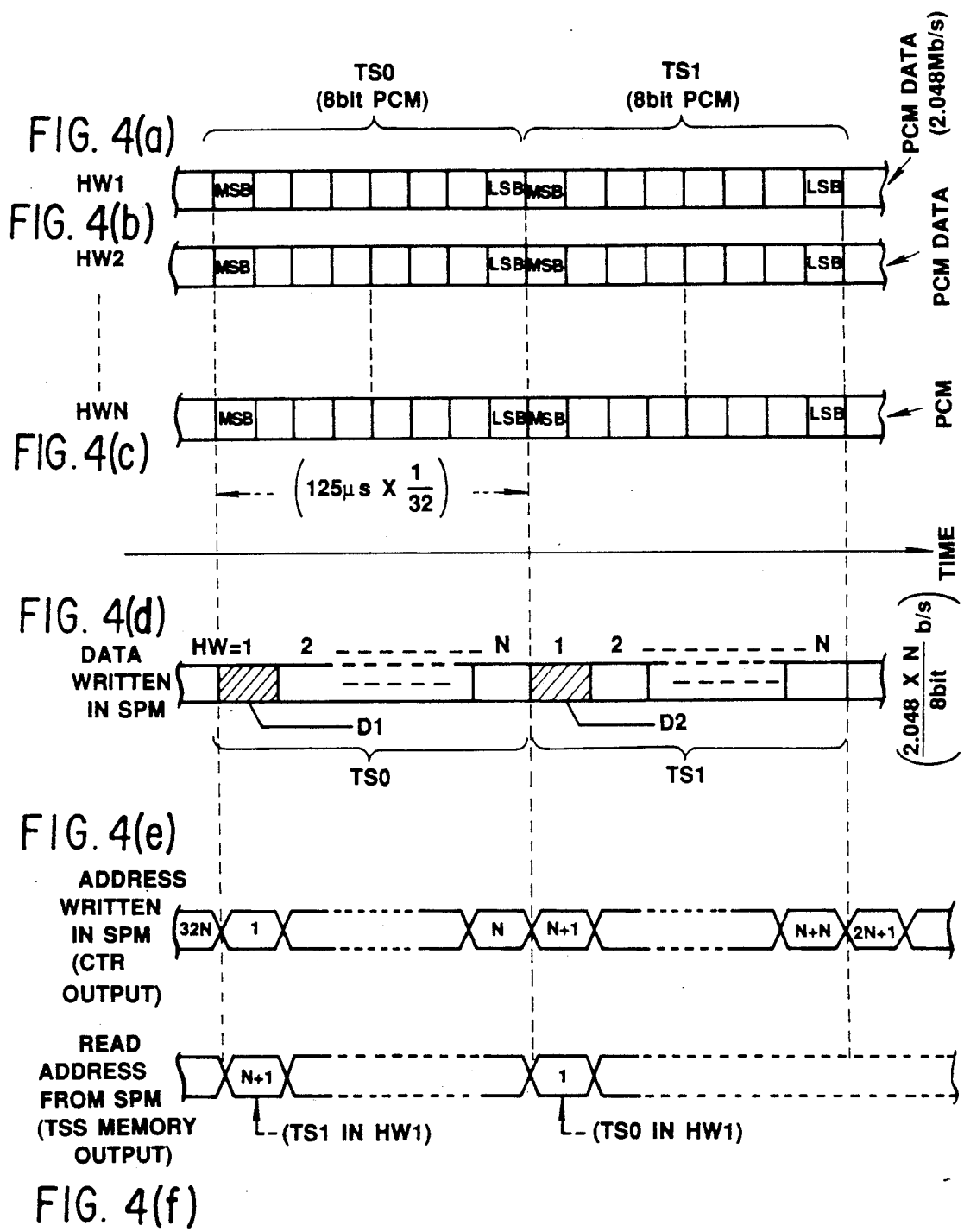
FIGS. 4a to 4f show a timing chart showing one example of the operational aspect of the time sharing switch in the telephone communication between two speakers.

FIG. 4 illustrates one example of the operational aspects of the time sharing switch 3 mainly in the telephone communication between such two subscribers. In FIG. 4. (a)-(c) show how the PCM data are sent to the respective time slots (TSO-TS32) of the input PCM highways HW1-HWN, (d) shows how the PCM data in the respective input PCM highways are multiplexed by the multiplexer 31 and written into the speech memory 32, (e) shows the contents of the telephone communication memory write address SWA output from the address counter 33 when the multiplexed PCM data is written into the speech memory 32, and (f) shows the contents of the speech memory read address SRA output from the exchange control (TSS) memory 34 in accordance with a command from the CPU 1 and a read address TRA comprising the counts of the address counter 33.

As will be obvious from FIG. 4, if the PCM data, for example, on the telephone set T1 is multiplexed into the time slot TS0 in the input PCM highway HW1 as shown hatched at D1 in FIG. 4(d), and the PCM data on the telephone set T2 is multiplexed into the time slot TS1 in the input PCN highway HW1, as shown hatched at D2 in FIG. 4(d), these PCM data are exchanged by applying to the speech memory (SPM) 32 the speech memory read address SRA comprising contents such as those shown in FIG. 4(f) to exchange the time slot TS1 with TS0 in the input PCM highway HW1.

The CPU 1 inputs as the data DTA the port numbers corresponding to the time slots TS0 and TS1 to be exchanged via the data bus to the exchange control memory 34 for the control of the time sharing switch 3 and generates a write signal WT to write these port numbers via the decoder 2 and a write address TWA to exchange and designate the exchange of the write positions of these port numbers to the exchange control memory 34. In this particular case, the time slots are exchanged actually by the contents of the address TWA. Of course, the port numbers themselves input to the exchange control memory 34 may be exchanged beforehand.

Thus the port numbers indicative of the time slots to be exchanged with each other are stored at addresses corresponding to the time slots TS0 and TS 1 in the exchange control memory 34. These port numbers are read when the address counter 33 makes a round to indicate a count corresponding to the same time slot and delivered to the speech memory 32 as the speech memory read address SRA (the read signal is not shown).

By such exchange control of the time sharing switch 3, the PCM data (as a voice signal generated by the telephone set T1) to the telephone set T2 is read from the speech memory 32 at the timing corresponding to the time slot TS1 in the output PCM highway HW1, input to the PCM codec 92 via the demultiplexer (DMPX) 35, converted to an analog voice signal by the PCM codec 92, and input to the telephone set T2 via the subscriber line circuit 82. Similarly, the PCM data (as a voice signal generated by the telephone set T2) to the telephone set T1 is read from the speech memory 32 at the timing of the time slot TS0 in the output PCM highway HW1, input via the demultiplexer 35 to the PCM codec 91, converted by the PCM codec 91 to an analog voice signal, and input to the telephone set T1 via the subscriber line circuit 81. In this way, telephone communication is possible between the telephone sets T1 and T2.

Figure 5:
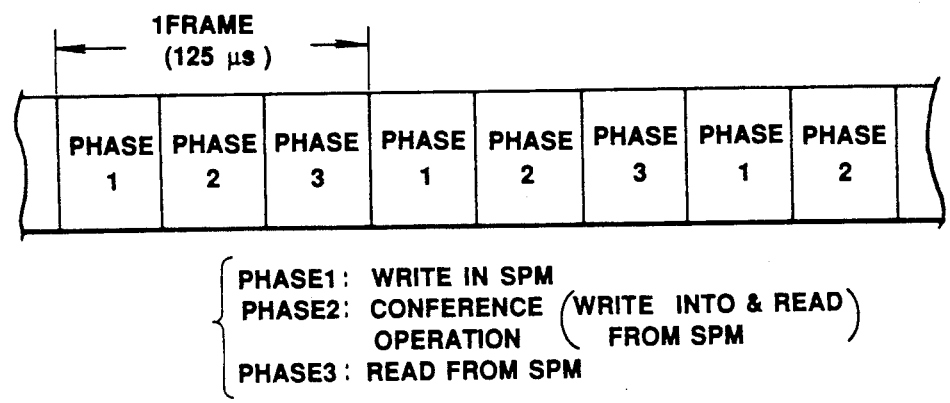
FIGS. 5 and 6a to 6c are timing charts showing the operational concept of the time sharing switch in a conference telephone communication.
Figure 6A:
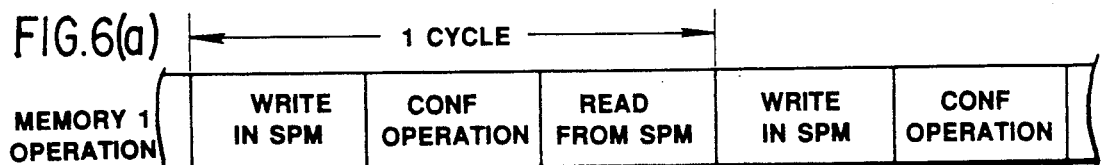
Figure 6B:
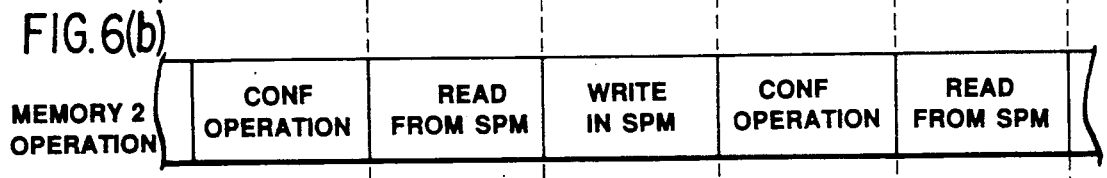
Figure 6C:
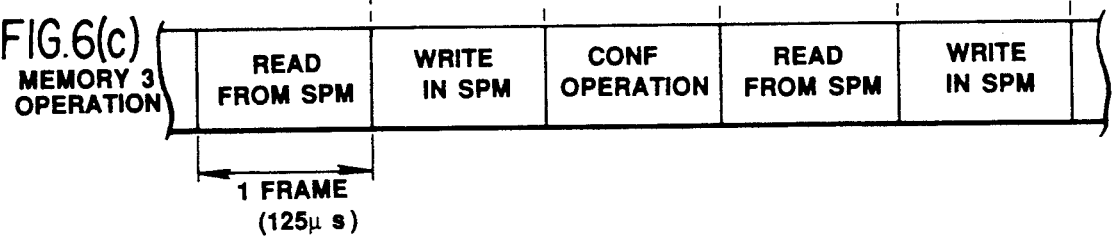

A conference telephone communication among three or more speakers will be described. In this case, the conference operation circuit (CONF) 36 of the time sharing switch 3 is connected logically to the speech memory 32 in accordance with the determination of the CPU 1 (FIG. 3). First, the operational concept of the speech memory 32 in such conference telephone communication will be described. As shown in FIG. 5, in the conference telephone communication, the speech memory 32 repeatedly performs a one-frame processing operation including a phase 1 in which the PCM data is written using as the write address SWA the count output of the address counter (CTR) 33 (the number of 0—the value of PCM highways × the number of time slots), a phase 2 in which appropriate PCM data is fetched into the conference calculation circuit 36 in accordance with the address "A" of the time slot given via a conference port designating memory to be described later, and the PCM data operated and output via the conference operation circuit 36 is written again at the same address, and a phase 3 in which appropriate PCM data is read using the output of the exchange control (TSS) memory 34 as a read address SRA into the demultiplexer (DMPX) 35. In order to support such operation of the speech memory 32 at high speed, three separate memories are usually disposed for the speech memory 31 to which the periodic operations are alternately allocated in the formats shown in FIGS. 6(a)-(c). Thus, the respective memories may only be required to perform one operation in one frame and thus the reliability of the speech memory 32 is greatly improved.

Figure 7:
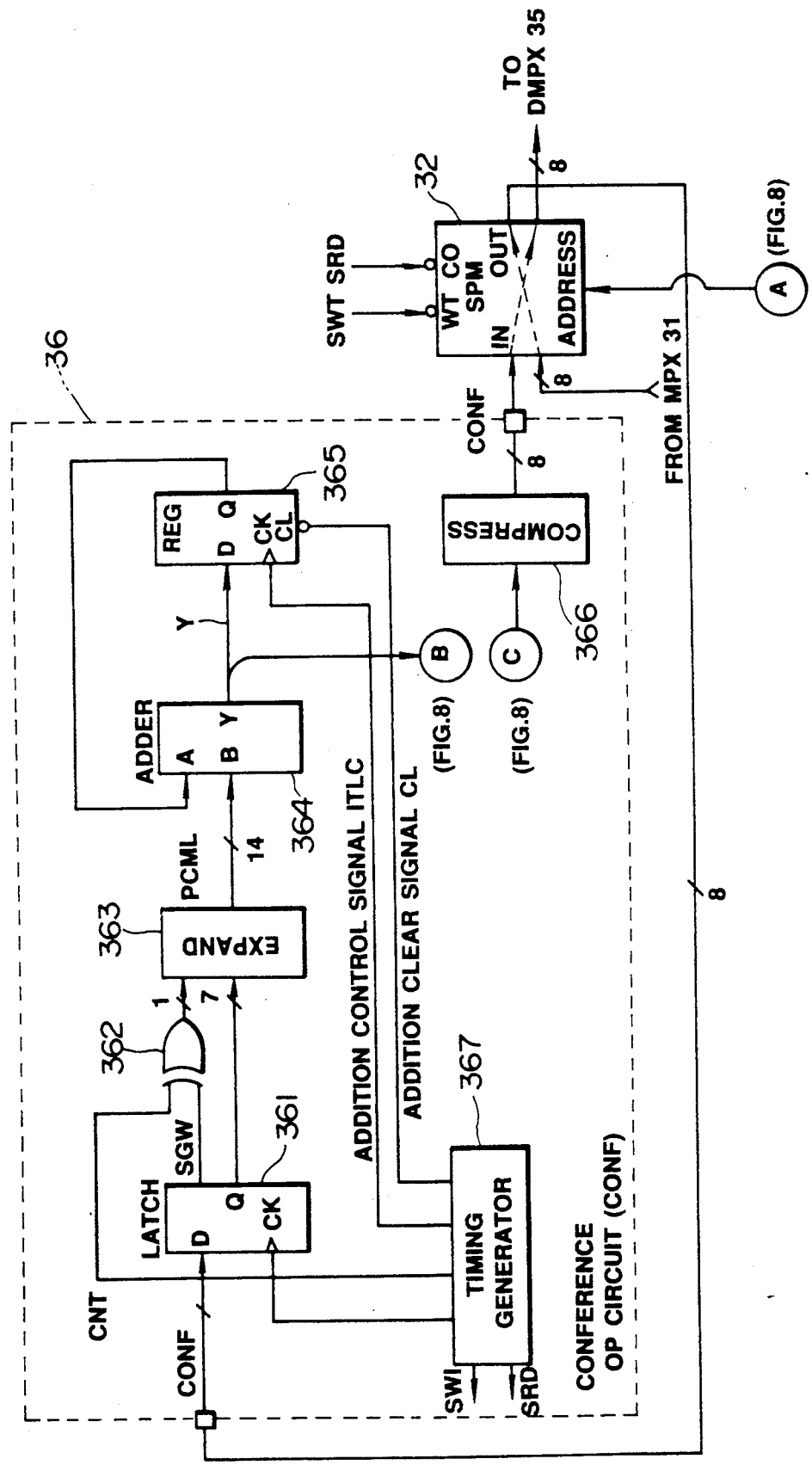
FIG. 7 is a specific block diagram of a conference operation circuit (CONF) of FIG. 3.
Figure 8:
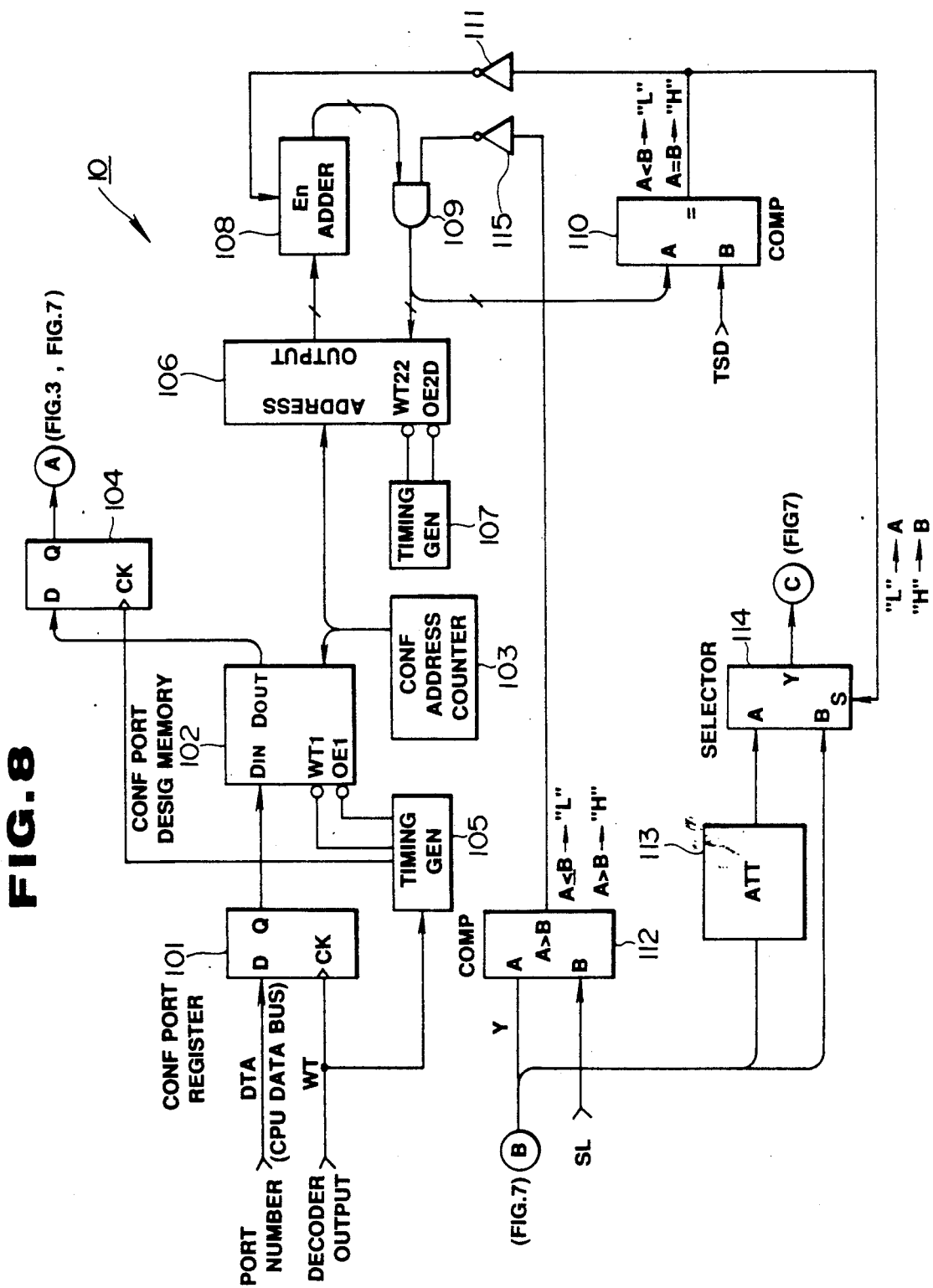
FIG. 8 is a block diagram of an illustrative telephone communication level monitoring and controlling circuit which is connected to the CONF of FIG. 7 to monitor and control the telephone communication level in a conference telephone communication.

FIG. 7 shows the structure of the conference operation circuit (CONF) 36. FIG. 8 shows the structure of the telephone communication level monitoring and controlling circuit 10 which has the conference port designating memory, generates the conference operation address "A" and is connected to the conference calculation circuit 36 to monitor and control the level of the telephone communication. FIGS. 9-12 show the respective operational aspects of these circuits. Referring to these Figures, the structure and conference telephone communication function of the electronic exchange according to the particular embodiment will be described in detail. As shown in detail in FIG. 7, the conference operation circuit 36 includes a register (latch) 361 in which the output PCM data on the respective speakers voices from the speech memory 32 are stored temporarily; an exclusive OR gate 362 which receives at one input the most significant bit, or sign bit SGW indicative of the positive or negative sign, of the temporarily stored PCM data and at the other input a control signal CNT generated from the timing generator 367 for the aforementioned (N-1) adding operation control to thereby perform an exclusive-OR operation on these signals; an expander 363 which expands the PCM data for the remaining 7 bits stored temporarily in the register 361 in accordance with the result of the exclusive-OR operation (at quantization, since a non-linear quantization which compresses the quantizing step is performed in accordance with the analog amplitude of the voice signal, the PCM data is expanded so as to be added simply); an adder 364 which adds the data expanded by the expander 363 and the data stored temporarily in a register (latch) 365; a compressor 366 which compresses the added data (accurately the data the level of which is controlled via the telephone communication level monitoring and controlling circuit shown in FIG. 8) to its original PCM data; and a timing generator 367 which generates storing timing pulses for the registers 361 and 365 (especially, an addition control signal TTLC for the register 365), a clear signal for the register 365 (an addition clear signal), and a read and write enable signal SRD and SWT to the speech memory 32 in the conference operation. A so-called u-characteristic (u-Low) or an A-characteristic (A-Low) is used as the compression/expansion characteristic, and the specifications of the expander 363 and compressor 366 are determined in accordance with the employed one of these characteristics. The aspects in which the respective signals are generated by the timing generator 367 are shown in FIGS. 11 and 12, and these signals will be described in detail later together with the operation of the conference operation circuit 36.

The telephone communication level monitoring and controlling circuit 10 is constructed as shown in FIG. 8 in which a conference port register 101 temporarily stores a port number corresponding to the time slot of a speaker participating in the conference telephone communication (delivered as the data DTA from the CPU 1) in accordance with the write signal WT (delivered as a decoded output by the decoder 2), a conference port designating memory (RAM) 102 stores the port numbers of a plurality of speakers output sequentially from the register 101, a conference address counter 103 designates the read and write address of the memory 102, a latch 104 which latches the data (on the port number) read from the memory 102, and a timing generator 105 generates a read and write enable signal for the conference port designating memory 102 in accordance with the write signal WT and a latch timing signal for the latch 104. The circuit portions constituting the read and write address "A" in the conference operation in the speech memory 32 are constituted by these circuits 101-105. Each of the outputs from the latch 104 becomes the read and write address "A". The conference address counter 103 is constituted so as to designate read and write addresses for the conference port numbers for 48 speakers (6 speakers × 8 sets) at a maximum.

In FIG. 8, reference numeral 106 denotes a timer memory in which the read and write address is designated by the conference address counter 103; 107, a timing generator which generates a read and write enable signal for the timer memory 106; 108, an adder which constitutes a timer in connection with the timer memory 106; 109, an AND gate for controlling the time-keeping operation of the timer; 110, a comparator which receives at its A input the output from the AND gate 109 (the timer output) and at its B input a set point TSD corresponding to the timer time in the timer (the added value from the adder 108 corresponding to a time of about 500 ms-1s) to compare these data values; 111, an invertor which enables the adder 108 when the comparison output from the comparator 110 indicates a logical "L" level and disables the adder 108 when the comparator output indicates a logical "H" level; 112, a comparator which receives at its A input a telephone communication signal addition output y ("B") from an adder 364 of the conference operation circuit 36 and at its B input a level reference signal SL to determine whether the attenuation of the telephone communication signal addition output y is required to compare the levels of these signals; 113, an attenuator which digitally attenuates appropriately the signal level of the telephone communication signal addition output y; 114, a selector which receives at its A input the attenuated output of the telephone communication signal (telephone communication addition output y) from the attenuator 113 and at its B input a direct telephone communication signal (telephone communication signal addition output y) not via the attenuator 113 to select the A-input signal when the comparator output indicates the logical "L" level and the B-input signal when the comparator output indicates the logical "H" level; 115, an invertor which "opens" the AND gate 109 when the output from the comparator 112 indicates the logical "L" level and conversely "closes" the AND gate 109 when the comparator output indicates the logical "H" level. These circuits 106-115 construct the circuit portion in which the telephone communication signal level is monitored and the level control is provided. The signal selected and output by the selector 114 is input to the compressor 366 of the conference operation circuit 36 of FIG. 7 as a telephone communication signal "C" the level of which is controlled by the circuit portion.

The operation of the conference port designating memory 102 and timer memory 106 which use the conference address counter 103 in common as address designating means will be described briefly with reference to FIGS. 9 and 10. First, the operation of the conference port designating memory 102 will be explained. Assume that telephone communication requests are made by three or more speakers. The CPU 1 (FIG. 1) recognizes this fact, sends via the data bus to the speakers participating in the conference the port numbers corresponding to the speakers, and delivers to the decoder 2 (FIG. 1) the I/O address data indicative of the I/O address of the conference port register 101 synchronously with the transmission of the port number data in order to form the conference telephone communication path. The I/O address data is decoded by the decoder 2 and the resulting decoded output WT is input to a clock input (CK) of the conference port register 101 and also input to the timing generator 105.

By such operation of the CPU 1, data on the port number delivered by the CPU 1 is stored in the conference port register 101 by the decoded output WT, and the data on the port number is input to the data input terminal (DIN) of the conference port designating memory 102. At this time, the memory 102 receives at its terminals a write signal WT 1 and an output enable signal OE 1 generated in the timing shown in FIGS.

9(d) and (e) from the timing generator 5 in accordance with the decoded output WT shown in FIG. 9(b). The memory also receives at its address terminal the address data output, in the form shown in FIG. 9(a), from the conference address counter 103.

Thus, the data on the respective speakers' port numbers input to the conference port register 101 are sequentially stored in the conference port designating memory 102 in accordance with the address value designated by the conference address counter 103 each time the write signal WT 1 generated by the timing generator 105 becomes active. The thus sequentially stored data on the speakers' port numbers are sequentially read out in the form shown in FIG. 9(f) from the conference port designating memory 102 each time the output enable signal OE 1 generated by the timing generator 105 becomes active. The data on the read port numbers are latched by the latch 104 and applied sequentially as the read and write address data "A" in the conference telephone communication to the appropriate address terminals of the speech memory 32.

The operation of the timer memory 106 will be described. The read and write address of the timer memory 106 is designated by the address data output in the form shown in FIG. 10(a) from the conference address counter 103 as in the conference port designating memory 102. The timer memory operates in such a manner that a new timer value (the output of the AND gate 109 which receives at its input the output of the adder 108) is written at the designated address in the timer memory in accordance with a write signal WT 2 output, in the form shown in FIG. 10(b), from the timing generator 107 synchronously with the read and write address, and that the timer value is read which is written at an address designated in the timer memory in accordance with an output enable signal OE 2 output, in the form shown in FIG. 10(c), from the timing generator 107. The read value is output in the form shown in FIG. 10(d) to the adder 108. If the adder 108 is active and the AND gate 109 is "open", the sequentially added and updated (by + one) timer values are read and written via the timer memory 106 each time the designated address becomes the same address (this corresponds to the time-keeping operation).

The operation of the timer constituted by such memory 106, adder 108 and AND gate 109 is controlled by the comparator 110 and converter 111. As described above, the comparator 110 receives at its A input the AND gate 109 output (the timer output) and at its B input a set point TSD corresponding to the timer time (the added output of the adder 108 corresponding to a time of about 500 ms-1 s), so that the adder 108 is also controlled so as to assume an active state via the inverter 111 until the output of the AND gate 109 arrives at the set point TSD (so long as the output of the comparator 110 is at the logical "L" level). When the output of the AND gate 109 arrives at the set point TSD (when the output of the comparator 110 arrives at the logical "H" level). The adder 108 becomes non-active, and continues to output a "0" timer value until it is controlled so as to be active again.

Finally, the whole operation of the conference operational circuit 36 and communication level monitoring and controlling circuit 10 in the conference communication will be described with reference to FIGS. 11 and 12. FIG. 11 illustrates the relationship between the address data output from the conference address counter 103 and the clear timing of the adder 364 in the conference operation circuit 36 shown in FIG. 7. In the particular embodiment, PCM data for six speakers are received twice successively in order to perform the aforementioned (N-1) adding operation. In order to process these data eight sets by eight sets, the conference address counter 103 repeatedly generates the value "0"–"95" (for 48 persons = 6 persons × 8 sets) as shown in FIG. 11(a). The timing generator 367 (FIG. 7) generates a one-pulse addition clear signal CL each time the counting operation of the conference address counter 103 is repeated twelve times synchronously with the counting operation of the counter 103. As shown in FIG. 11(b), each time data reception is completed twice for one conference, the adder 364 is cleared, so that a separate (N-1) adding operation is performed for each conference.

FIG. 12 illustrates the operation of the conference operation circuit 36 and the telephone communication level monitoring and controlling circuit 10 corresponding to the address data by enlarging the time portion in the "conference #1 (six persons)" of FIG. 11. As shown in FIG. 12, the output of the conference port designating memory 102 and a latch pulse to the latch 104 are generated in the form shown in FIGS. 12(b) and (c) in accordance with the address data (FIGS. 9 and 12(a)) output from the conference address counter 103. As a result, the conference operation read and write address "A" added to the speech memory 32 is output from the latch 104 in the form shown in FIG. 12(d). The characters a', b', c' ... in FIGS. 12(b) and (d) denote address values corresponding to the respective port numbers of the participants in the conference.

Read data (PCM) data) is input in the form shown in FIG. 12(e) from the speech memory 32 to the conference operation circut (CONF) 36 in accordance with such address designation to the speech memory 32. The PCM data (of 8 bits) input to the conference operation circuit 36 are stored temporarily in the register 361 in accordance with a latch pulse (FIG. 12(f)) generated by the timing generator 367 in the conference operation circuit 36 while being input to the expander 363 which converts, for example, a u-characteristic value to a linear value. In the expander 363, the linear conversion is performed under predetermined conditions based on the exclusive-OR operation on the sign bit of the PCM data (the most significant bit) SGW and a control signal CNT (FIG. 12(i)) generated by the timing generator 367, and the resulting expanded signal PCML is then applied to the adder 364, as mentioned above.

Assume that, as shown in FIG. 12(e), PCM data a, b, c, d, e and f indicative of the six speaker's voices are input to the conference operation circuit 36 twice successively in order to perform the (N-1) adding operation. In that case, the control signal CNT is logically inverted in the form in FIG. 12(i) at a first and a second times, and, if the exclusive OR output indicates the logical "L" level (when PCM data is received at the second time), data indicative of the "2' complements" of the corresponding linear values are output as the expanded signals PCML from the expander 363.

First, such operation (conference operation) of the expander 363 and adder 364 in the conference operation circuit 36 will be rearranged as follows:
(1) When the conference operation circuit 36 receives the six persons' PCM data a, b, c, d, e and f, it performs the addition "x = a + b + c + d + e + f" through an addition loop comprising the adder 364 and register 365 in accordance with an addition control signal TTLC generated in the form shown in FIG. 12(h), and the result of the addition "x" is stored in the register 365.

(2) Subsequently, when the conference operation circuit 36 receives second PCM data a, b, c, d, e and f, the control signal CNT output from the timing generator 367 has already been logically inverted (FIG. 12(i)), so that the exclusive OR output from the gate 362 indicates the logical "L" level, and the expander 363 outputs complements of a linear values corresponding to the respective PCM data a, b, c, d, e and f. The output complement values are added via the adder 364 to the value "x" stored in the register 365. In this case, as shown in FIG. 12(h), the adder control signal TTLC is also no-active, so that the adder 364 outputs the added values "x-a", "x-b", "x-c", "x-d", "x-e" and "x-f", sequentially.

FIG. 12(g) shows a transition of the PCM data output by the adder 364 through the operations (1) and (2) and converted by the compressor 366 to their original characteristic, namely, a transition of the PCM data output by the conference operation circuit 36. Such PCM data is read from or written into the speech memory 32 in accordance with speech memory read and write signals SRD and SWT generated in the forms shown in FIGS. 12(j) and (k), respectively, by the timing generator 367, and a conference telephone communication based on the present (N -1) addition system is realized.

In the particular case, the output of the adder 364 (telephone communication signal addition output y) is not directly input to the expander 366, but is examined and controlled with reference to its telephone communication level or the digital level of the PCM data after the addition through the communication level monitoring and controlling circuit 10, and then input to the compressor 366.

The operation of the telephone communication level monitoring and controlling circuit 10 shown in FIG. 8 will be mainly described below. In the particular embodiment, the output y ("B") of the adder 364 after the conference operation is input to the comparator 112 to be compared with the level reference signal SL in order to determine whether attenuation or the insertion of the attenuator 113 is needed.

At the beginning of the conference telephone communication, the respective speakers' port numbers are set. As described above, but the level of the output y of the adder 364 is initially low. Thus the relationship "signal y signal SL" is normally held, and the comparison signal indicative of the logical "L" level is output by the comparator 112. This means that the AND date 109 is brought into an "open" state.

Initially, the output (timer value) of the adder 108 added to the A input of the comparator 110 via the AND gate 109 is low compared to the reference value (timer set point) TSD applied to the B input of the comparator 110, so that, as a result, the adder 108 is put under an active state.

Thus the timer comprising the timer memory 106, adder 108 and AND gate 109 starts its timer operation, as mentioned. When the timer arrives at a value corresponding to a preset time of 500 ms-1 s, it stops (the adder 108 is disabled in accordance with the output of the comparator 110). Namely, at the beginning of the conference telephone communication, the timer value (the value stored in the memory 106) arrives at and is held at the value equal to the set point STD. During the time of 500 ms-1 s preset as the timer set point TSD, the selector 114 selectively outputs an attenuated signal received at its A input from the attenuator 113, but there is practically no problem because this selective output continues to be output for only a short time at the beginning of the conference telephone communication.

Thus, the initial state of the conference telephone communication is as follows:
(1) The timer value is held at the value equal to the set point TSD in the timer; and
(2) A telephone communication signal path not including the attenuator 113 is selected; namely, "B" and "C" are short-circuited.

Assume now that a telephone communication signal addition output y concerning any one of the speakers exceeds the reference signal SL level, for example, for the reason that the speakers start to talk simultaneously. The comparison output from the comparator 112 then changes to the logical "H" level.

This causes the AND gate 109 to be "closed", and the timer value concerning the speaker whose telephone communication signal addition output y has exceeded the reference signal SL level is updated to "0". Thus the relationship between the inputs to the comparator 110 becomes "A=B", and the comparison output of the comparator 110 changes to the logical "L" level.

As a result, the adder 108 becomes active, but the timer value continues to be updated to "0", and the selector 114 selects a signal at its A input, namely, the telephone communication signal attenuated by the attenuator 113 to input same to the compressor 366 until the telephone communication signal addition output y falls below the reference signal SL level. Thus, the telephone communication signal y concerning the speaker and having exceeded the reference signal SL level is suppressed and adjusted by the attenuator 113 to an optimal level and transferred.

Thereafter, when the telephone communication signal addition output y returns to a value lower than the reference signal SL level, the comparison output of the comparator 112 also returns to its logical "L", so that the timer value concerning that speaker starts to be updated. When a time corresponding to the timer set point TSD has passed, a comparison output at the logical "H" level indicating "the A input=the B input" is output from the comparator 110. Thus the timer is disabled, and the selector 114 returns to its state in which it selects a telephone communication signal which does not pass through the attenuator 113 and inputs that signal to the compressor 366.

As described above, according to the particular embodiment, a conference telephone communication containing many participators is realized with high efficiency. When the telephone communication signal level concerning any one of the speakers has exceeded the reference signal SL level for the reason that the speakers have started to talk simultaneously in the conference telephone communication, the attenuator is inserted to adjust the level of that telephone communication signal to an appropriate value during the time when the reference signal SL level is exceeded and until a time corresponding to the timer set point TSD passes after that telephone communication signal level falls below the reference signal SL level. Since the attenuation is released using the timer function a predetermined time (500 ms-1 s) after the telephone communication signal level falls below the reference signal SL level, fluctuations in the amplitude of the telephone communication signal (and hence the voice signal) are not repeated uselessly at short periods and no uncomfortable feeling is given to the respective speakers.

Figure 13:
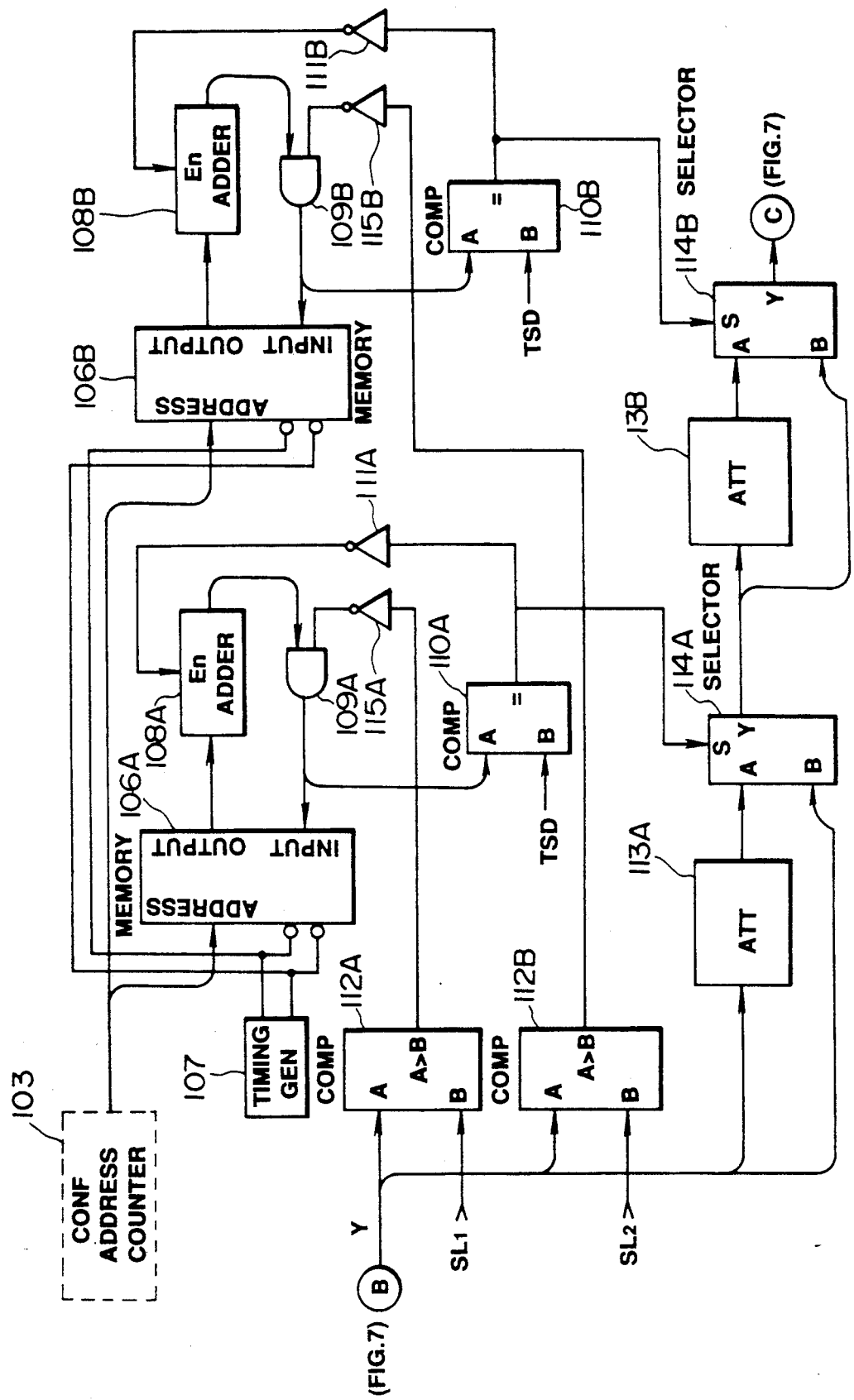
FIG. 13 is another block diagram of the telephone communication level monitoring and controlling circuit as another embodiment of the electronic exchange with a conference telephone communication function according to the present invention.

About 10 dB of attenuation by the attenuator 113 will suffice because it is considered to be rare that three or more start to speak simultaneously in a 3- or 6-person conference. If there is a possibility that the telephone communication signal level will be high excessively in a conference, such as a 6-person conference, in which many persons participate, one circuit portion of the telephone communication level monitoring and controlling circuit 10, mentioned above, which actually monitors and controls the telephone communication level should be provided additionally in the structure shown in FIG. 13. In FIG. 13, alphabets A, B given to the reference numerals as in 108A, 108B, identify the A and B systems, respectively, of the circuit portion which actually monitors and controls the telephone communication level. In FIGS. 13 and 8, like reference numerals are given to like elements. In the structure of FIG. 13, the level of the telephone communication signal y is compared with the level of a first reference signal SL1 level and with a second reference signal SL 2 level higher than the first reference signal SL 1 in A- and B-system comparators 112A and 112B, respectively. First, when the telephone communication signal level exceeds the first reference signal SL 1 level, only the first attenuator 113A is inserted in the telephone communication signal path. When the telephone communication signal level further exceeds the second reference signal SL 2 level, the second attenuator 113B is inserted in series with the first attenuator 113A in the path. In this way, the telephone communication level is properly adjusted stepwise.

Of course, if the monitoring and controlling function of the telephone communication level is divided more finely, finer telephone communication level control will be possible and service to the participators in the conference will be further improved.

What is claimed is:

1. A conference telephone communication method in which telephone communication signals on a plurality of speakers in a time sharing multiplexed telephone communication path are added, the telephone communication signal on any particular speaker is subtracted, and the resulting signal is transferred to the remaining respective speakers, comprising the steps of:
    monitoring the levels of the telephone communication signals transferred to the remaining respective speakers,
    selectively attenuating the telephone communication signals, the levels of which have exceeded a preset threshold level,
    transferring the attenuated signals to the remaining speakers, and
    releasing the selective attenuation of the telephone communication signals, which have exceeded the threshold level, a predetermined time after conditions under which the threshold level is exceeded have disappeared.

2. A conference telephone communication method according to claim 1, wherein the threshold level includes a plurality of stepwise different sub-levels, and the degree of the attenuation is stepwise determined in accordance with a degree in which each of the telephone communication signals exceeds these sub-levels.

3. A conference telephone communication method according to claim 2, further including the step of releasing the selective attenuation of the telephone communication signals, which have exceeded the corresponding sub-threshold levels, to the corresponding degrees a predetermined time after conditions under which the corresponding threshold sub-levels are exceeded have disappeared.

4. An electronic exchange with a conference telephone communication function, comprising:
    address generating means for sequentially generating read and write addresses corresponding to the port numbers of the speakers participating in a conference telephone communication;
    a speech memory for temporarily storing telephone communication signals on the respective speakers corresponding to their port numbers in accordance with the read and write addresses generated sequentially;
    conference operation means for sequentially receiving the telephone communication signals on the respective speakers read from the speech memory and performing an (N-1) adding operation on those signals;
    telephone communication level monitoring and controlling means for comparing a preset threshold level with the levels of second signals indicative of the respective results of the (N-1) adding operation, selectively attenuating the respective second signals the level of which exceeds the preset threshold level, and rewriting the attenuated results in the corresponding designated address areas in the speech memory;
    wherein the telephone communication level monitoring and controlling means includes:
        an attenuator for attenuating the second signal to a predetermined level;
        a selector for receiving at a first input the output of the attenuator and at a second input the second signal not passing through the attenuator, and selecting and delivering one of the received signals to the speech memory as a signal to be rewritten;
        a comparator for comparing the levels of the second signals with a preset threshold level;
        timer means actuated in accordance with a change in the level of the second signals below the threshold level as the result of the comparison; and
        selector control means for controlling the selector such that when the levels of the second signals are below the threshold level as the result of the comparison, the selector selects the second signal at the second input and that when the levels of the second signals exceed the threshold level as the result of the comparison, the selector selects the output of the attenuator at the first input during the time when the levels of the second signals exceed the threshold level and until the timer means arrives at a timer time.

5. An electronic exchange with a conference telephone communication function, comprising:
    exchange means for adding telephone communication signals on a plurality of speakers in a time sharing multiplexed telephone communication path, for subtracting the telephone communication signal on any particular speaker, and for transferring the resulting signal to the remaining respective speakers;

monitoring control means for monitoring the levels of the telephone communication signals transferred to the remaining respective speakers, for selectively attenuating the telephone communication signals, the levels of which have exceeded a preset threshold level, and for transferring the attenuated signals to the remaining respective speakers; and means for releasing the selective attenuation of the telephone communication signals, which have exceeded the threshold level, a predetermined time after conditions under which the threshold level is exceeded have disappeared.

* * * * *